US012801551B2

(12) United States Patent
Barth et al.

(10) Patent No.: US 12,801,551 B2
(45) Date of Patent: Nov. 17, 2026

(54) ADDRESS ASSIGNMENT

(71) Applicant: Infineon Technologies AG, Neubiberg (DE)

(72) Inventors: Martin Barth, Passau (DE); Markus Matzberger, Tiefenbach (DE)

(73) Assignee: Infineon Technologies AG, Neubiberg (DE)

( * ) Notice: Subject to any disclaimer, the term of this patent is extended or adjusted under 35 U.S.C. 154(b) by 53 days.

(21) Appl. No.: 18/954,234

(22) Filed: Nov. 20, 2024

(65) Prior Publication Data

US 2025/0209029 A1 Jun. 26, 2025

(30) Foreign Application Priority Data

Dec. 21, 2023 (DE) ......................... 102023136176.7

(51) Int. Cl.
*G06F 13/40* (2006.01)

(52) U.S. Cl.
CPC .... *G06F 13/404* (2013.01); *G06F 2213/0052* (2013.01)

(58) Field of Classification Search
None
See application file for complete search history.

(56) References Cited

U.S. PATENT DOCUMENTS

2014/0336821 A1* 11/2014 Blaine ..................... H04L 67/10
700/275
2019/0372903 A1* 12/2019 Dress .................... H04L 49/201

FOREIGN PATENT DOCUMENTS

DE 102015013442 A1 4/2017

OTHER PUBLICATIONS

Office Action, in the German language, from counterpart German Application No. 2023P23038DE, dated Sep. 16, 2024, 8 pp.

* cited by examiner

*Primary Examiner* — Scott C Sun
(74) *Attorney, Agent, or Firm* — Shumaker & Sieffert, P.A.

(57) ABSTRACT

A method for assigning an address to an electronic device, and devices and circuit arrangements for implementing the method. The method may comprise:

a) sending a general command from a controller of a circuit arrangement to all electronic devices of the circuit arrangement, wherein the general command prompts each electronic device to start sending a respective unique identifier (UID) of the respective electronic device;
b) sending the respective UIDs from the electronic devices bit-by-bit in parallel;
c) performing a bit-by-bit arbitration among the electronic devices based on the UIDs until only one electronic device remains active;
d) sending an electrical parameter from the active electronic device to the controller;
e) determining a property of the active electronic device from the electrical parameter; and
f) assigning an address to the active electronic device from a predetermined set of addresses.

20 Claims, 2 Drawing Sheets

ADDRESS ASSIGNMENT

This Application claims priority to German Application Number 102023136176.7 filed on Dec. 21, 2023, the entire content of which is incorporated herein by reference.

TECHNICAL FIELD

The present disclosure relates to a method for assigning an address to an electronic device, an electronic device, a circuit arrangement and a use thereof.

BACKGROUND

Groups of electronic devices and specifically networks typically require addresses for the electronic devices in order to enable communication. When assigning an address to an electronic device, interference with an address of a further electronic device should be avoided for clarity reasons. This can specifically be problematic for electronic devices of the same type. Thus, pre-defined address ranges may typically be required. Further, assigning such addresses typically requires additional connected passive components for address selection.

SUMMARY

In a first aspect, a method for assigning an address to an electronic device is presented. The method comprises:

a) sending a general command from a controller of a circuit arrangement to all electronic devices of the circuit arrangement, wherein the general command prompts each electronic device to start sending a respective unique identifier (UID) of the respective electronic device;

b) sending the respective UIDs from the electronic devices bit-by-bit in parallel;

c) performing a bit-by-bit arbitration among the electronic devices based on the UIDs until only one electronic device remains active;

d) sending an electrical parameter from the active electronic device to the controller;

e) determining a property of the active electronic device from the electrical parameter; and f) assigning an address to the active electronic device from a predetermined set of addresses.

In a further aspect, an electronic device is presented. The electronic device has an address assigned by using at least the following steps:

a) sending a general command from a controller of a circuit arrangement to all electronic devices of the circuit arrangement, wherein the general command prompts each electronic device to start sending a respective unique identifier (UID) of the respective electronic device;

b) sending the respective UIDs from the electronic devices bit-by-bit in parallel;

c) performing a bit-by-bit arbitration among the electronic devices based on the UIDs until only one electronic device remains active;

d) sending an electrical parameter from the active electronic device to the controller;

e) determining a functional property of the active electronic device from the electrical parameter; and f) assigning an address to the active electronic device from a predetermined set of addresses.

In a further aspect, a circuit arrangement is presented. The circuit arrangement comprises a plurality of electronic devices, at least one controller and at least one interconnection. The interconnection at least partially interconnects the electronic devices and the controller. At least one of the electronic devices has an address assigned by using at least the following steps:

a) sending a general command from the controller to all electronic devices of the circuit arrangement, wherein the general command prompts each electronic device to start sending a respective unique identifier (UID) of the respective electronic device;

b) sending the respective UIDs from the electronic devices bit-by-bit in parallel;

c) performing a bit-by-bit arbitration among the electronic devices based on the UIDs until only one electronic device remains active;

d) sending an electrical parameter from the active electronic device to the controller;

e) determining a property of the active electronic device from the electrical parameter; and f) assigning an address to the active electronic device from a predetermined set of addresses.

In a further aspect, a use of at least one of the method, the electronic device and the circuit arrangement is presented for an automotive application.

Those skilled in the art will recognize additional features and advantages upon reading the following detailed description, and upon viewing the accompanying drawings.

BRIEF DESCRIPTION OF THE DRAWINGS

The present disclosure is illustrated by way of example, and not by way of limitation, in the figures of the accompanying drawings in which like reference numerals refer to similar or identical elements. The elements of the drawings are not necessarily to scale relative to each other. The features of the various illustrated examples can be combined unless they exclude each other.

DETAILED DESCRIPTION

Figure 1:
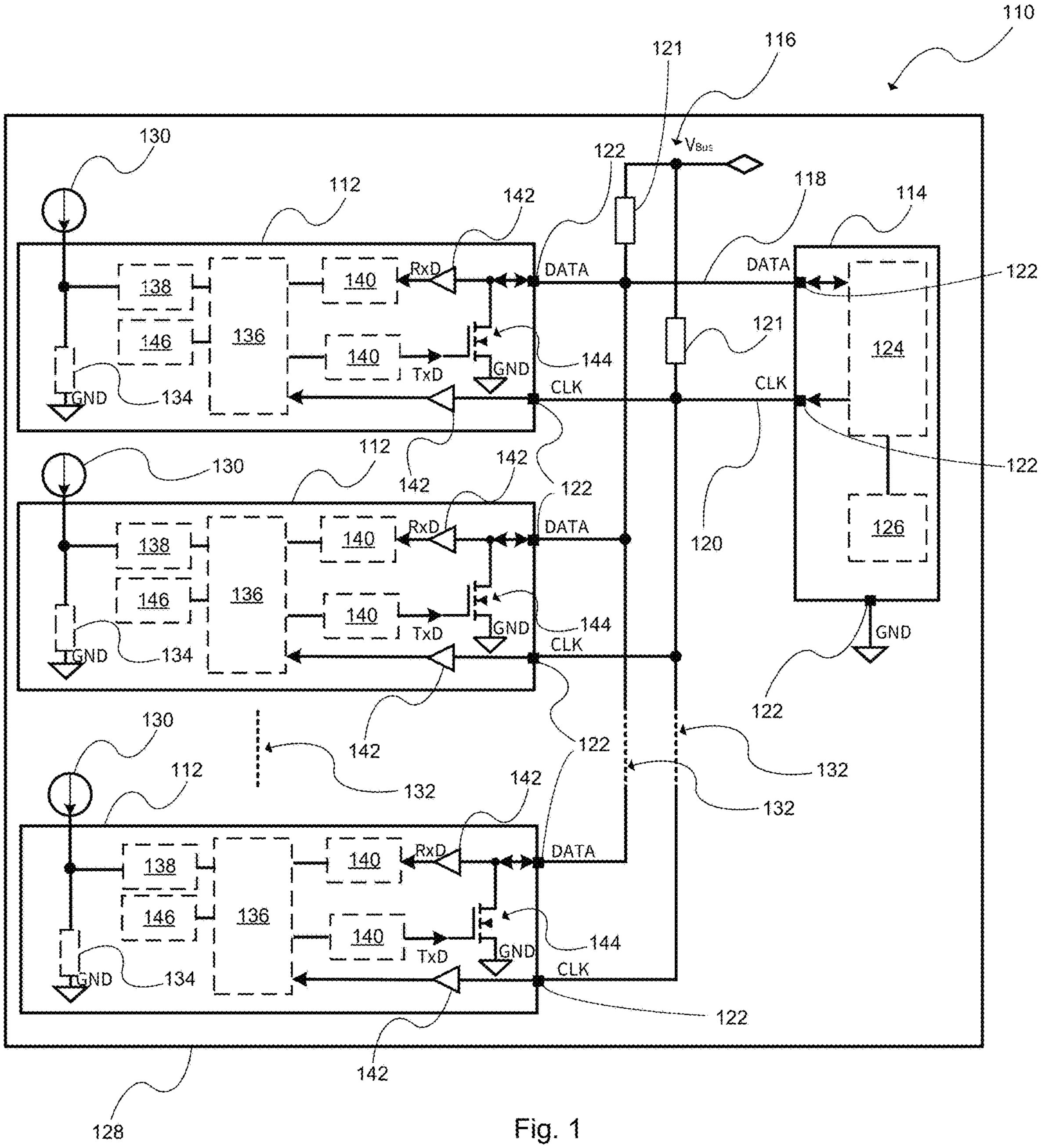
FIG. 1 illustrates an exemplary embodiment of a circuit arrangement according to the present disclosure in a schematic fashion.

In a first aspect, a method for assigning an address to an electronic device is presented. The term "electronic device" as generally used herein is a broad term and is to be given its ordinary and customary meaning to a person of ordinary skill in the art and is not to be limited to a special or customized meaning. The electronic device may be a device using electrical energy during operation. The electronic device may be or may comprise at least one electronic circuit.

The electronic device may comprise at least one electronic component. The electronic component may be connected to at least one further electronic component. Thus, the electronic device may be an assembly of at least two electronic components, which are at least partially interconnected through conductive elements. As an example, the electronic components may comprise resistors, inductors, capacitors, diodes and/or transistors and/or assemblies thereof such as logic gates and/or processors. As an example, the conductive elements may comprise wires and/or traces.

Specifically, the electronic device may be or may comprise at least one integrated circuit. Thus, the electronic device or at least a part of the electronic device may be arranged on at least one piece of semiconductor material, specifically silicon, silicon carbide and/or gallium nitride. Thus, the electronic device may be or may comprise at least one semiconductor device. The semiconductor device may be a device comprising at least one semiconductor material, specifically silicon, silicon carbide and/or gallium nitride. Specifically, the electronic device may be network compatible. Thus, the electronic device may be configured for communicating with at least one further electronic device. The electronic device may be configured for interpreting or following or understanding at least one communication protocol. The electronic device may comprise at least one logic circuit for communication. The electronic device may comprise at least one transceiver for sending and/or receiving data. The electronic device may comprise at least one analog-to-digital converter (ADC). The electronic device may comprise at least one pin for sending and/or receiving data.

The term "address" as generally used herein is a broad term and is to be given its ordinary and customary meaning to a person of ordinary skill in the art and is not to be limited to a special or customized meaning. The address may be an identifier or a tag configured for identifying or tagging the electronic device within a group of electronic devices. Specifically, the electronic device may be a part of a network. The address may be a network address. The network may be an at least partially interconnected group of electronic devices of identical or of different type. The address may be configured for controlling or directing a data transfer between electronic devices. Thus, the address may be configured for identifying a source and/or a destination of a data package which is transferred.

The term "assigning", including grammatical variations thereof, as generally used herein is a broad term and is to be given its ordinary and customary meaning to a person of ordinary skill in the art and is not to be limited to a special or customized meaning. The assigning may be an act of allocating or designating a first entity to a second entity, in this case an address to an electronic device. The assigning may be an act of linking or connecting the first entity and the second entity, in this case the address and the electronic device. Thus, the address and the electronic device may be associated with each other after the assignment. Assigning an address to the electronic device may enable the electronic device to communicate with other electronic devices, specifically within a network. Specifically, assigning an address to the electronic device may enable other electronic devices to address the electronic device such as when sending a data package.

In a step a), the method comprises sending a general command from a controller of a circuit arrangement to all electronic devices of the circuit arrangement. The circuit arrangement comprises a plurality of electronic devices, at least one controller and at least one interconnection at least partially interconnecting the electronic devices and the controller, as will be outlined in further detail below. The term "circuit arrangement" as generally used herein is a broad term and is to be given its ordinary and customary meaning to a person of ordinary skill in the art and is not to be limited to a special or customized meaning. Thus, the circuit arrangement may be or may comprise at least one electronic circuit, specifically at least one integrated circuit. Specifically, the circuit arrangement may comprise a plurality of electronic circuits. As said, the circuit arrangement specifically comprises a plurality of electronic devices and a controller, which may specifically be or comprise electronic circuits or integrated circuits. The circuit arrangement may be or may comprise at least one printed circuit board (PCB). The PCB may at least partially provide the interconnection of the circuit arrangement, such as by providing traces between the electronic devices and the controller.

The term "printed circuit board", in short "PCB", as generally used herein is a broad term and is to be given its ordinary and customary meaning to a person of ordinary skill in the art and is not to be limited to a special or customized meaning. The PCB may be or may comprise a carrier or a support for at least one electronic component, specifically, for the electronic devices and the controller of the circuit arrangement. The PCB may comprise a flat board configured for supporting and/or connecting the electronic component. Thus, the PCB may comprise at least one insulating material such as plastics and/or at least one conducting material such as a metal. The conducting material may be patterned on the insulating material for forming a circuit arrangement or at least a part thereof, specifically at least connections between electronic components. Thus, the PCB may comprise a plurality of traces or at least one trace.

As said, the circuit arrangement comprises a controller. The term "controller" as generally used herein is a broad term and is to be given its ordinary and customary meaning to a person of ordinary skill in the art and is not to be limited to a special or customized meaning. The controller may be an entity configured for observing or regulating or operating or managing at least one further entity. The controller may be a computing device. The controller may be an electronic device. Thus, the controller may be or may comprise at least one electronic circuit, specifically an integrated circuit. The controller may comprise at least one processor, e.g. a central processing unit. The controller may comprise at least one clock. The controller may comprise at least one memory. The controller may comprise at least one transceiver for transceiver for sending and/or receiving data. The controller may comprise at least one pin for sending and/or receiving data. The controller may specifically be microcontroller. The circuit arrangement may comprise a plurality of microcontrollers. The controller may specifically be a main microcontroller of the circuit arrangement or a central microcontroller of the circuit arrangement. However, a multi-master arrangement may also be feasible within the circuit arrangement.

As said, the circuit arrangement comprises an interconnection. The term "interconnection" as generally used herein is a broad term and is to be given its ordinary and customary meaning to a person of ordinary skill in the art and is not to be limited to a special or customized meaning. The interconnection may be or may comprise an interface between a plurality of components of the circuit arrangement, specifically between the controller and the electronic devices of the circuit arrangement. Thus, the interconnection may be configured for interconnecting the components at least partially, such that the components can communicate with each other at least partially. In other words, the interconnection may allow a communication of the components of the circuit arrangement with each other. The components, specifically the electronic devices and/or the controller, may require at least partially different voltages. Thus, at least one electronic device may comprise at least one level shifter for voltage conversion. The level shifter may be configured for shifting or converting signals from one logic level or voltage domain to another. The interconnection may specifically be a digital interconnection. However, in principle, the interconnection may also be an analog interconnection. The interconnection may comprise at least one bus, specifically at least one serial bus. The bus may comprise at least one signal line, i.e. a conductive path. The signal line may be a data line. The signal line may be a clock line. Specifically, the bus may comprise at least one data line. The bus may further comprise a clock line. The data line may be used for transmitting a data package. The clock line may be used for synchronization. As an example, the bus may be an Inter-Integrated Circuit ($I^2C$). However, other options may also be feasible.

Further in step a), the general command prompts each electronic device to start sending a respective unique identifier (UID) of the respective electronic device. The term "general command" as generally used herein is a broad term and is to be given its ordinary and customary meaning to a person of ordinary skill in the art and is not to be limited to a special or customized meaning. The general command may be a command or an instruction which may be sent out globally to all connected devices, specifically to all digital drivers, more specifically to all digital drivers in one network. The general command may be a command or an instruction which may be understood globally by all connected electronic devices. The general command may comprise an address, such as an address in a command register. The address may specifically be stored in each command register of each digital driver. The general command may be a broadcasted command. Thus, the general command may be broadcasted in a network of electronic devices. The terms "general call", "general address" or "target address" may be used synonymously to the term "general command". Thus, the general command may specifically not be sent only to a selected group of devices, which may require knowing their addresses before. The general command may not require an acknowledgement of a receiver of the general command.

The term "unique identifier", in short "UID", as generally used herein is a broad term and is to be given its ordinary and customary meaning to a person of ordinary skill in the art and is not to be limited to a special or customized meaning. The UID may be a tag or an indicator configured for clearly or distinctly identifying or tagging an entity, specifically an electronic device. In other words, the UID may specifically be an attribute of the electronic device configured for clearly distinguishing the electronic device from further electronic devices, specifically including further electronic devices of the same type. Thus, two or more electronic devices of the same type may have different UIDs. In other words, two or more electronic devices which are identical in design may have different UIDs. The UID may be programmed on a non-volatile memory of the electronic device. The UID may be hardware programmed on the electronic device. The UID may be derived from an assigned chip identifier (chip ID) by using a predetermined algorithm. The chip ID and/or the algorithm may be determined by a manufacturer of the electronic device.

In a step b), the method further comprises sending the respective UIDs from the electronic devices bit-by-bit in parallel. Specifically, the UIDs may be send via in interconnection of the circuit arrangement, wherein the interconnection at least partially interconnects the electronic devices and the controller. In other words, the electronic devices may send their UIDs to each other and/or to the controller via the interconnection of the circuit arrangement. As said, the interconnection may specifically comprise a serial bus. The method may comprise a step b1), performed after step b), comprising receiving the UIDs of the electronic devices with the controller. Thus, the controller may initially know the UIDs of the electronic devices in the circuit arrangement. All electronic devices may simultaneously or synchronously send their UIDs bit-by-bit or in other words bitwise. A frequency may be determined by a clock, such as a clock of the controller. Thus, a clock signal may be used for determining a transmission of individual bits and for ensuring a parallel bitwise transmission, specifically via the serial bus. While sending their UIDs, the electronic devices may perform a bit-by-bit arbitration, as outlined below.

In a step c), the method further comprises performing a bit-by-bit arbitration among the electronic devices based on the UIDs until only one electronic device remains active. The term "bit-by-bit arbitration" as generally used herein is a broad term and is to be given its ordinary and customary meaning to a person of ordinary skill in the art and is not to be limited to a special or customized meaning. An arbitration may be a process of deciding which component may be allowed for controlling an interconnection, specifically a bus, for sending information. Specifically, the arbitration may be a process of deciding which electronic device of the circuit arrangement may be allowed for controlling the interconnection of the circuit arrangement, for sending its UID to the controller of the circuit arrangement. Thus, the arbitration may be a process for deciding which electronic device may remain active on the interconnection. The arbitration may specifically be a distributed arbitration, more specifically a distributed arbitration by self-selection. Thus, the access to the interconnection may be self-granted based on a decision made among the electronic devices. The bit-by-bit arbitration may be an arbitration wherein after each bit of the UIDs, it is decided, specifically by the electronic devices themselves, which electronic devices remain active and continue sending their UIDs and which electronic devices go passive and stop sending their UIDs. As indicated, each electronic device may comprise a logic circuit for communication. The logic circuit may specifically also be configured for performing the bit-by-bit arbitration. The logic circuit may comprise at least one logic gate, such as an OR gate. The electronic device may further comprise at least one buffer for buffering the UIDs bit-by-bit for the bit-by-bit arbitration.

The bit-by-bit arbitration in step c) may specifically comprise the following sub-steps performed by each electronic device:

c1) bit-by-bit receiving the UIDs of all further electronic devices of the circuit arrangement;

c2) bit-by-bit comparing each bit of the own UID to a logical disjunction of the corresponding bits of the UIDs of the further electronic devices;

c3) if a bit of the own UID is equal to the logical disjunction, remain active by continuing to send the UID; and c4) if a bit of the own UID not equal to the logical disjunction, go passive by stopping to send the UID.

The logical disjunction may be an OR-combination of the corresponding bits of the UIDs. Corresponding bits may be bits which are equal in position within a bit-by-bit representation of the UIDs. As already indicated, a frequency of the bit-by-bit arbitration in step c) may determined by a clock frequency of a clock of the controller. Thus, the controller may as said comprise a clock and the clock may be configured for determining a frequency of the bit-by-bit arbitration in step c). At an end of the bit-by-bit arbitration, only one electronic device may remain active and send its UID. Thus, the controller, which may already have received all UIDs in step b1), may now know the UID of the active electronic device. If more than one electronic device remains active at step c), the method may be restarted at step a). In other words, in case of an error during the bit-by-bit arbitration, the process may be repeated. Otherwise, i.e. in case of an error-free bit-by-bit arbitration, the method may be continued with subsequent steps.

In a step d), the method further comprises sending an electrical parameter from the active electronic device to the controller. The term "electrical parameter" as generally used herein is a broad term and is to be given its ordinary and customary meaning to a person of ordinary skill in the art and is not to be limited to a special or customized meaning. The electrical parameter may in principle be an arbitrary physical quantity referring to an arbitrary electronic device. The electrical parameter may be or may comprise at least one measurable electrical variable or measurement value. The electrical parameter may be selected from the group consisting of: a voltage; a resistance; a current. Other options may also be feasible.

The electrical parameter may particularly be characteristic or specific for the electronic device. Particularly, the electrical parameter may also be characteristic for each electronic device of a plurality of electronic devices of the same type, such as two or more electronic devices which are identical in design. The electrical parameter may be an application-specific electrical parameter, particularly a position-specific electrical parameter. Thus, the electrical parameter may be labelling the electronic device in a specific application, such as within a circuit arrangement, specifically referring to a position of the electronic device within the circuit arrangement. Thus, the application may specifically refer to an application of the electronic device in the circuit arrangement. As an example, the electrical parameter may be labelling the position of the electronic device in the circuit arrangement or may be characteristic for the position of the electronic device in the circuit arrangement. Other options besides the position may however also be feasible.

The electrical parameter may be predetermined by at least one of a component of the electronic device and an external supply source. The external supply source may be an external voltage source or an external current source, such as a voltage source or a current source of the circuit arrangement or even external from the circuit arrangement. Thus, the circuit arrangement may comprise at least one supply source configured for supplying at least one of an application-specific voltage and an application-specific current to at least one electronic device of the circuit arrangement. The component may be a resistor, a capacitor or an inductor. Thus, the electronic device may comprise at least one component providing an application-specific electrical parameter. The electrical parameter may be predetermined by at least one of an application-specific resistance, an application-specific capacitance and an application-specific inductance of at least one component the electronic device. Correspondingly, the component may be at least one of a resistor, a capacitor and an inductor.

Particularly, the component may be at least one of an application-specific resistor, an application-specific capacitor and an application-specific inductor. As an example, step d) may comprise sending an application-specific voltage from the active electronic device to the controller. The application-specific voltage may be dependent on an application-specific resistance of a component of the electronic device and the component may be an application-specific resistor. Additionally or alternatively, the application specific-voltage may be dependent on a predetermined current provided by a current source of the circuit arrangement. However, other options may also be feasible.

In a step e), the method further comprises determining a property of the active electronic device from the electrical parameter. The term "property" as generally used herein is a broad term and is to be given its ordinary and customary meaning to a person of ordinary skill in the art and is not to be limited to a special or customized meaning. The property may be an arbitrary qualitative or quantitative feature of characteristic or attribute of an entity, specifically of the electronic device in this case. The property determined in step e) may be an application-specific property. Specifically, the property determined in step e) may be selected from the group consisting of: a position of the electronic device; a function of the electronic device; a type of the electronic device. The position may specifically be a position within the circuit arrangement. The function may specifically be a function within the circuit arrangement. Thus, the position and/or the function may in particular be application-specific characteristics. The position may be particularly relevant in the present disclosure, since, when considering predetermined mounting options on a PCB, from the position further properties may be derived, such as the function or the type of the electronic device. However, generally other options may again also be feasible.

In a step f), the method further comprises assigning an address to the active electronic device from a predetermined set of addresses. Thus, the electronic device may from then on be addressable during an operation of the circuit arrangement. Step f) may further comprise acknowledging the assigned address by a handshake between the active electronic device and the controller. The set of addresses and also the acknowledge or other commands may be defined in a communication protocol used in the circuit arrangement. More generally, at least one of the set of addresses, the general command and the bit-by-bit arbitration may be defined in a communication protocol. At least one of step e) and step f) may be performed by using the controller. Specifically, the property in step e) may be determined by the controller, e.g. by using a look-up table. As an example, the controller may comprise an analog-to-digital converter for reading out an application-specific voltage as electrical parameter and may assign the application-specific voltage to a position of the electronic device by using a look-up table mapping specific voltages to specific positions. Generally, the controller may be configured for processing an electrical parameter and for assigning the electrical parameter to a property of the electronic device, e.g. by using a processor and/or a look-up table. The look-up table may be stored in a memory of the controller. The method may at least partially be computer-implemented. For instance, step e) may at least partially be computer-implemented.

Throughout the present disclosure, the presented method steps may be performed in the indicated order. It shall be noted, however, that a different order may also be possible. The method may comprise further method steps which are not listed. Further, one or more of the method steps may be performed once or repeatedly. Further, two or more of the method steps may be performed simultaneously or in a timely overlapping fashion. Specifically, steps a) to f) may be repeated continuously until all electronic devices of the circuit arrangement are assigned an address. After each repetition cycle, assigned addresses and electronic devices with assigned addresses may be left out for the following repetition cycles. Thus, from repetition cycle to repetition cycle one electronic device less may participate in the process until all electronic devices of the circuit arrangement are assigned an address.

In a further aspect, an electronic device is presented. The electronic device has an address by using at least the following steps:

a) sending a general command from a controller of a circuit arrangement to all electronic devices of the circuit arrangement, wherein the general command prompts each electronic device to start sending a respective unique identifier (UID) of the respective electronic device;
b) sending the respective UIDs from the electronic devices bit-by-bit in parallel;
c) performing a bit-by-bit arbitration among the electronic devices based on the UIDs until only one electronic device remains active;
d) sending an electrical parameter from the active electronic device to the controller;
e) determining a functional property of the active electronic device from the electrical parameter; and
f) assigning an address to the active electronic device from a predetermined set of addresses.

Generally, the address of the electronic device may be assigned by using a method according to any one of the embodiments referring to method as disclosed above or below in further detail. For further definitions and embodiments regarding the electronic device reference may specifically also be made to the definitions and embodiments presented with respect to the method for assigning an address to the electronic device.

In a further aspect, a circuit arrangement is presented. The circuit arrangement comprises a plurality of electronic devices, at least one controller and at least one interface. The electronic device has an address assigned by using at least the following steps:

a) sending a general command from the controller to all electronic devices of the circuit arrangement, wherein the general command prompts each electronic device to start sending a respective unique identifier (UID) of the respective electronic device;
b) sending the respective UIDs from the electronic devices bit-by-bit in parallel;
c) performing a bit-by-bit arbitration among the electronic devices based on the UIDs until only one electronic device remains active;
d) sending an electrical parameter from the active electronic device to the controller;
e) determining a property of the active electronic device from the electrical parameter; and
f) assigning an address to the active electronic device from a predetermined set of addresses.

The address may be assigned by using a method according to any one of the embodiments referring to a method as disclosed above or below in further detail. The electronic device may be an electronic device according to any one of the embodiments referring to an electronic device as disclosed above or below in further detail. For further definitions and embodiments regarding the circuit arrangement reference may specifically also be made to the definitions and embodiments presented with respect to the method for assigning an address to the electronic device.

In a further aspect, a use of at least one of the presented method, the electronic device and the circuit arrangement is presented for an automotive application. In other words, the method and/or the electronic device and/or the circuit arrangement may specifically be used for an automotive application. Other uses may of course also be feasible as the skilled person will immediately recognize. Specifically, the method is a method according to any one of the embodiments referring to a method as disclosed above or below in further detail. The electronic device is an electronic device according to any one of the embodiments referring to an electronic device as disclosed above or below in further detail. The circuit arrangement is a circuit arrangement according to any one of the embodiments referring to a circuit arrangement as disclosed above or below in further detail.

The methods and devices presented herein have considerable advantages over the prior art as already indicated throughout the description. They can help avoid assigning interfering addresses, specifically for electronic devices of the same type. This may lead to less susceptibility to errors, such as trying to address a specific electronic device with an address which has also been assigned to a further electronic device. This may eventually increase operational safety of a system using the electronic device or the circuit arrangement comprising the electronic device, such as an automotive system having considerable safety requirements. Consequently, the presented methods and devices may further help avoiding pre-defined address ranges, which may lead to greater flexibility. Further, as also outlined, a serial interface may be used, which may lead to a reduction of pins at the controller. Overall, this may lead to less process complexity and eventually reduce cost.

As used herein, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically are used only once when introducing the respective feature or element. In most cases, when referring to the respective feature or element, the expressions "at least one" or "one or more" are not repeated, nonwithstanding the fact that the respective feature or element may be present once or more than once.

Further, as used herein, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The disclosure may, as the skilled person will recognize, be performed by using alternative features. Similarly, features introduced by "in an embodiment of the disclosure" or similar expressions are intended to be optional features, without any restriction regarding alternative embodiments of the disclosure, without any restrictions regarding the scope of the disclosure and without any restriction regarding the possibility of combining the features introduced in such way with other optional or non-optional features of the disclosure.

Summarizing and without excluding further possible embodiments, the following Embodiments may be envisaged:

Embodiment 1: A method for assigning an address to an electronic device, the method comprising:

a) sending a general command from a controller of a circuit arrangement to all electronic devices of the circuit arrangement, wherein the general command prompts each electronic device to start sending a respective unique identifier (UID) of the respective electronic device;

b) sending the respective UIDs from the electronic devices bit-by-bit in parallel;

c) performing a bit-by-bit arbitration among the electronic devices based on the UIDs until only one electronic device remains active;

d) sending an electrical parameter from the active electronic device to the controller;

e) determining a property of the active electronic device from the electrical parameter; and f) assigning an address to the active electronic device from a predetermined set of addresses.

Embodiment 2: The method according to the preceding Embodiment, wherein steps a) to f) are repeated continuously until all electronic devices of the circuit arrangement are assigned an address.

Embodiment 3: The method according to the preceding Embodiment, wherein, after each repetition cycle, assigned addresses and electronic devices with assigned addresses are left out for the following repetition cycles.

Embodiment 4: The method according to any one of the preceding Embodiments, wherein, if more than one electronic device remains active at step c), the method is restarted at step a).

Embodiment 5: The method according to any one of the preceding Embodiments, wherein the electrical parameter is an application-specific electrical parameter.

Embodiment 6: The method according to any one of the preceding Embodiments, wherein the electrical parameter is selected from the group consisting of: a voltage; a resistance; a current.

Embodiment 7: The method according to any one of the preceding Embodiments, wherein the electrical parameter is predetermined by at least one of a component of the electronic device and an external supply source.

Embodiment 8: The method according to the preceding Embodiment, wherein the external supply source is an external voltage source or an external current source.

Embodiment 9: The method according to any one of the two preceding Embodiments, wherein the component is a resistor, a capacitor or an inductor.

Embodiment 10: The method according to any one of the preceding Embodiments, wherein the electrical parameter is predetermined by at least one of an application-specific resistance, an application-specific capacitance and an application-specific inductance of at least one component the electronic device.

Embodiment 11: The method according to any one of the preceding Embodiments, wherein step d) comprises sending an application-specific voltage from the active electronic device to the controller.

Embodiment 12: The method according to the preceding Embodiment, wherein the application-specific voltage is dependent on an application-specific resistance of a component of the electronic device.

Embodiment 13: The method according to the preceding Embodiment, wherein the component is an application-specific resistor.

Embodiment 14: The method according to any one of the preceding Embodiments, wherein the property determined in step e) is an application-specific property.

Embodiment 15: The method according to any one of the preceding Embodiments, wherein the property determined in step e) is selected from the group consisting of: a position of the electronic device; a function of the electronic device; a type of the electronic device.

Embodiment 16: The method according to any one of the preceding Embodiments, wherein the bit-by-bit arbitration in step c) comprises the following sub-steps performed by each electronic device:

c1) bit-by-bit receiving the UIDs of all further electronic devices of the circuit arrangement;

c2) bit-by-bit comparing each bit of the own UID to a logical disjunction of the corresponding bits of the UIDs of the further electronic devices;

c3) if a bit of the own UID is equal to the logical disjunction, remain active by continuing to send the UID; and c4) if a bit of the own UID not equal to the logical disjunction, go passive by stopping to send the UID.

Embodiment 17: The method according to the preceding Embodiment, wherein corresponding bits are equal in position within a bit-by-bit representation of the UIDs.

Embodiment 18: The method according to any one of the preceding Embodiments, wherein a frequency of the bit-by-bit arbitration in step c) is determined by a clock frequency of a clock of the controller.

Embodiment 19: The method according to any one of the preceding Embodiments, further comprising step b1) performed after step b), wherein step b1) comprises receiving the UIDs of the electronic devices with the controller.

Embodiment 20: The method according to any one of the preceding Embodiments, wherein at least one of step e) and step f) is performed by using the controller.

Embodiment 21: The method according to any one of the preceding Embodiments, wherein step f) comprises acknowledging the assigned address by a handshake between the active electronic device and the controller.

Embodiment 22: The method according to any one of the preceding Embodiments, wherein the UIDs are sent via an interconnection of the circuit arrangement, wherein the interconnection at least partially interconnects the electronic devices and the controller.

Embodiment 23: The method according to any one of the preceding Embodiments, wherein at least one of the set of addresses, the general command and the bit-by-bit arbitration is defined in a communication protocol.

Embodiment 24: The method according to any one of the preceding Embodiments, wherein the electronic device is a part of a network and wherein the address is a network address.

Embodiment 25: The method according to any one of the preceding Embodiments, wherein the UID is programmed on a non-volatile memory of the electronic device.

Embodiment 26: The method according to any one of the preceding Embodiments, wherein the UID is derived from an assigned chip identifier (chip ID) by using a predetermined algorithm.

Embodiment 27: The method according to any one of the preceding Embodiments, wherein the method is at least partially computer-implemented.

Embodiment 28: An electronic device having an address assigned by using at least the following steps:

a) sending a general command from a controller of a circuit arrangement to all electronic devices of the circuit arrangement, wherein the general command prompts each electronic device to start sending a respective unique identifier (UID) of the respective electronic device;
b) sending the respective UIDs from the electronic devices bit-by-bit in parallel;
c) performing a bit-by-bit arbitration among the electronic devices based on the UIDs until only one electronic device remains active;
d) sending an electrical parameter from the active electronic device to the controller;
e) determining a property of the active electronic device from the electrical parameter; and
f) assigning an address to the active electronic device from a predetermined set of addresses.

Embodiment 29: The electronic device according to the preceding Embodiment, wherein the address is assigned by using a method according to any one of the preceding method Embodiments.

Embodiment 30: The electronic device according to any one of the preceding Embodiments referring to an electronic device, wherein the electronic device comprises at least one logic circuit for communication, specifically for performing the bit-by-bit arbitration.

Embodiment 31: The electronic device according to any one of preceding Embodiments referring to an electronic device, wherein the electronic device comprises at least one buffer for buffering the UIDs bit-by-bit for the bit-by-bit arbitration.

Embodiment 32: The electronic device according to any one of the preceding Embodiments referring to an electronic device, wherein the electronic device comprises at least one level shifter for voltage conversion.

Embodiment 33: The electronic device according to any one of the preceding Embodiments referring to an electronic device, wherein the electronic device comprises at least one component providing an application-specific electrical parameter.

Embodiment 34: The electronic device according to the preceding Embodiment, wherein the component is at least one of an application-specific resistor, an application-specific capacitor and an application-specific inductor.

Embodiment 35: The electronic device according to any one of the preceding Embodiments referring to an electronic device, wherein the electronic device is network compatible.

Embodiment 36: The electronic device according to any one of the preceding Embodiments referring to an electronic device, wherein the electronic device is a semiconductor device.

Embodiment 37: The electronic device according to any one of the preceding Embodiments referring to an electronic device, wherein the electronic device comprises at least one electronic circuit, specifically at least one integrated circuit.

Embodiment 38: A circuit arrangement comprising a plurality of electronic devices, at least one controller and at least one interconnection, wherein the interconnection at least partially interconnects the electronic devices and the controller, wherein at least one of the electronic devices has an address assigned by using at least the following steps:

a) sending a general command from the controller to all electronic devices of the circuit arrangement, wherein the general command prompts each electronic device to start sending a respective unique identifier (UID) of the respective electronic device;
b) sending the respective UIDs from the electronic devices bit-by-bit in parallel;
c) performing a bit-by-bit arbitration among the electronic devices based on the UIDs until only one electronic device remains active;
d) sending an electrical parameter from the active electronic device to the controller;
e) determining a property of the active electronic device from the electrical parameter; and
f) assigning an address to the active electronic device from a predetermined set of addresses.

Embodiment 39: The circuit arrangement according to the preceding Embodiment, wherein the address is assigned by using a method according to any one of the preceding method Embodiments.

Embodiment 40: The circuit arrangement according to any one of the preceding Embodiments referring to a circuit arrangement, wherein the electronic devices are at least partially electronic devices according to any one of the preceding Embodiments referring to an electronic device.

Embodiment 41: The circuit arrangement according to any one of the preceding Embodiments referring to a circuit arrangement, wherein the circuit arrangement comprises at least one printed circuit board (PCB).

Embodiment 42: The circuit arrangement according to any one of the preceding Embodiments referring to a circuit arrangement, further comprising at least one supply source configured for supplying at least one of an application-specific voltage and an application-specific current to at least one electronic device of the circuit arrangement.

Embodiment 43: The circuit arrangement according to any one of the preceding Embodiments referring to a circuit arrangement, wherein the interconnection comprises at least one bus, specifically at least one serial bus.

Embodiment 44: The circuit arrangement according to the preceding Embodiments, wherein the bus comprises at least one signal line.

Embodiment 45: The circuit arrangement according to any one of the preceding two Embodiments, wherein the bus comprises a clock line and a data line.

Embodiment 46: The circuit arrangement according to any one of the preceding three Embodiments, wherein the bus is an Inter-Integrated Circuit ($I^2C$).

Embodiment 47: The circuit arrangement according to any one of the preceding Embodiments referring to a circuit arrangement, wherein the controller is a microcontroller, specifically a main microcontroller of the circuit arrangement.

Embodiment 48: The circuit arrangement according to any one of the preceding Embodiments referring to a circuit arrangement, wherein the controller comprises at least one clock, wherein the clock is configured for determining a frequency of the bit-by-bit arbitration in step c).

Embodiment 49: A use for an automotive application of at least one of a method according to any one of the preceding method Embodiments, an electronic device according to any one of the preceding Embodiments referring to an electronic device and a circuit arrangement according to any one of the preceding Embodiments referring to a circuit arrangement.

Further optional features and embodiments will be disclosed in more detail in the subsequent description of embodiments, preferably in conjunction with the dependent embodiments. Therein, the respective optional features may be realized in an isolated fashion as well as in any arbitrary feasible combination, as the skilled person will realize. The scope of the disclosure is not restricted by the preferred embodiments. The embodiments are schematically depicted in the Figures. Therein, identical reference numbers in these Figures refer to identical or functionally comparable elements.

FIG. 1 illustrates an exemplary embodiment of a circuit arrangement 110 in a schematic fashion. The circuit arrangement 110 comprises a plurality of electronic devices 112, a controller 114 and an interconnection 116. The interconnection 116 at least partially interconnects the electronic devices 112 and the controller 114. The interconnection 116 may be a bus 116, specifically a serial bus 116, more specifically an $I^2C$ 116. The interconnection 116 may comprise two signal lines, i.e. a data line 118 and a clock line 120. The interconnection 116 may comprise at least one pullup-resistor 121. Specifically, the data line 118 and the clock line 120 may each comprise a pullup-resistor 121. The data line 118 and the signal line 120 may each be connected to pins 122 of the electronic devices 112 and the controller 114, respectively, for connecting the electronic devices 112 and the controller 114. The controller 114 may be a microcontroller 114, specifically a main microcontroller 114 of the circuit arrangement 110. The controller 114 may comprise an interface 124 to the interconnection 116, specifically a serial bus interface 124. The controller 114 may comprise at least one clock 126. The clock 126 may be configured for determining a frequency of a bit-by-bit arbitration among the electronic devices 112, as will be outlined in further detail below.

The circuit arrangement 110 may comprise a PCB 128. In other words, the circuit arrangement 110 may be arranged on the PCB 128. Thus, the controller 114, the electronic devices 112 and the interconnection 116 may be arranged on the PCB 128. The interconnection 114 may at least partially be part of the PCB 128. Specifically, the data line 118 and the clock line 120 may be traces on the PCB 128. The circuit arrangement 110 may further comprise at least one supply source 130. The supply source 130 may in principle be configured for supplying at least one of an application-specific voltage and an application-specific current to at least one electronic device 112 of the circuit arrangement 110. As indicated in FIG. 1, the supply source 130 may specifically comprise a current source 130. Thus, each electronic device 112 may be supplied with an application-specific current, as will be explained in further detail below.

For clarity reasons, FIG. 1 shows only three electronic devices 112 explicitly. As also indicated by dots 130, in principle, an arbitrary number of electronic devices 112 is obviously also possible. Each electronic device 112 may comprise a component 134 providing an application-specific electrical parameter. As shown in FIG. 1, the component 134 may specifically be an application-specific resistor 134. However, other options, such as an application-specific capacitor and an application-specific inductor, may also be possible. Correspondingly, the application-specific parameter may specifically be an application-specific resistance. However, again, an application-specific inductance or an application-specific conductance may also be feasible. The application-specific parameter may further specifically be a position-specific parameter. Thus, the application-specific parameter may be indicative or characteristic for a position of the electronic device 112 within the circuit arrangement 110. However, other options may also be feasible. For instance, the application-specific parameter may be a function-specific parameter and may be indicative for a function of the electronic device 112 in the circuit arrangement 110.

Each electronic device 112 may further comprise a logic circuit 136. The logic circuit 136 may generally be configured for enabling communication via the interconnection 116, specifically with the controller 114 and also with the further electronic devices 112. Thus, the electronic device 112 may generally be network compatible. Specifically, the logic circuit 136 may also be configured for enabling communication of the electronic devices 112 among each other, such as when performing a bit-by-bit arbitration. Thus, the logic circuit 136 may specifically also be configured for performing a bit-by-bit arbitration among the electronic devices 112. Further, the logic circuit 136 may be configured for basic computational operations and/or signal processing. The electronic device 112 may comprise at least one ADC 138. The ADC 138 may be connected to the component 134 and the logic circuit 138. Thus, the logic circuit 136 may be configured for processing signals from the ADC 138. Generally, the logic circuit 136 may be configured for processing digital signals. The logic circuit 136 may comprise at least one logic gate, e.g. an OR gate. The electronic device 112 may further comprise at least one buffer 140. Specifically, as shown in FIG. 1, the electronic device 112 may comprise two buffers 140, one for input and one for output. The buffers 140 may be connected to the logic circuit 136. The buffers 140 may generally be configured for buffering data. Specifically, as will be outlined in further detail below, the buffers may be configured for buffering UIDs for a bit-by-bit arbitration.

Each electronic device 112 may further comprise a level shifter 142 for voltage conversion. The level shifter 142 may be configured for adapting a voltage of input signals, such as an input data signal or an input clock signal, from the interconnection 116 to the requirements of the logic circuit 136. As said, the interconnection 116 may specifically be a bus 116, more specifically an $I^2C$. Thus, the level shifter 142 may specifically be configured for adapting $V_{Bus}$ to a voltage level of the electronic device 112, more specifically of the logic circuit 136. As also already indicated, the interconnection 116, specifically the $I^2C$ 116, may comprise a data line 118 and a clock line 120 connected to respective pins 122 of the electronic device 112. Input data and output data may be sent via the data line 118 as shown in FIG. 1. Thus, the electronic device 112 may further comprise at least one switching element 144, specifically at least one transistor 144, for switching between input data and output data. In FIG. 1, input data or received data is indicated by RxD and output data or transmitted data is indicated by TxD. The electronic device 112 may further comprise at least one memory 146, specifically at least one non-volatile memory 146 for storing a UID of the electronic device 112. The UID may be derived from an assigned chip ID by using a predetermined algorithm and programmed on the non-volatile memory 146. The mentioned components, and optionally also further not explicitly mentioned components, may be connected and arranged in an electronic circuit as indicated in FIG. 1. Thus, the electronic device 112 may comprise an electronic circuit. Specifically, the electronic device 112 may comprise an integrated circuit. Thus, the electronic device 112 may be arranged on a piece of semiconductor material. In other words, the electronic device 112 may be a semiconductor device 112.

Figure 2:
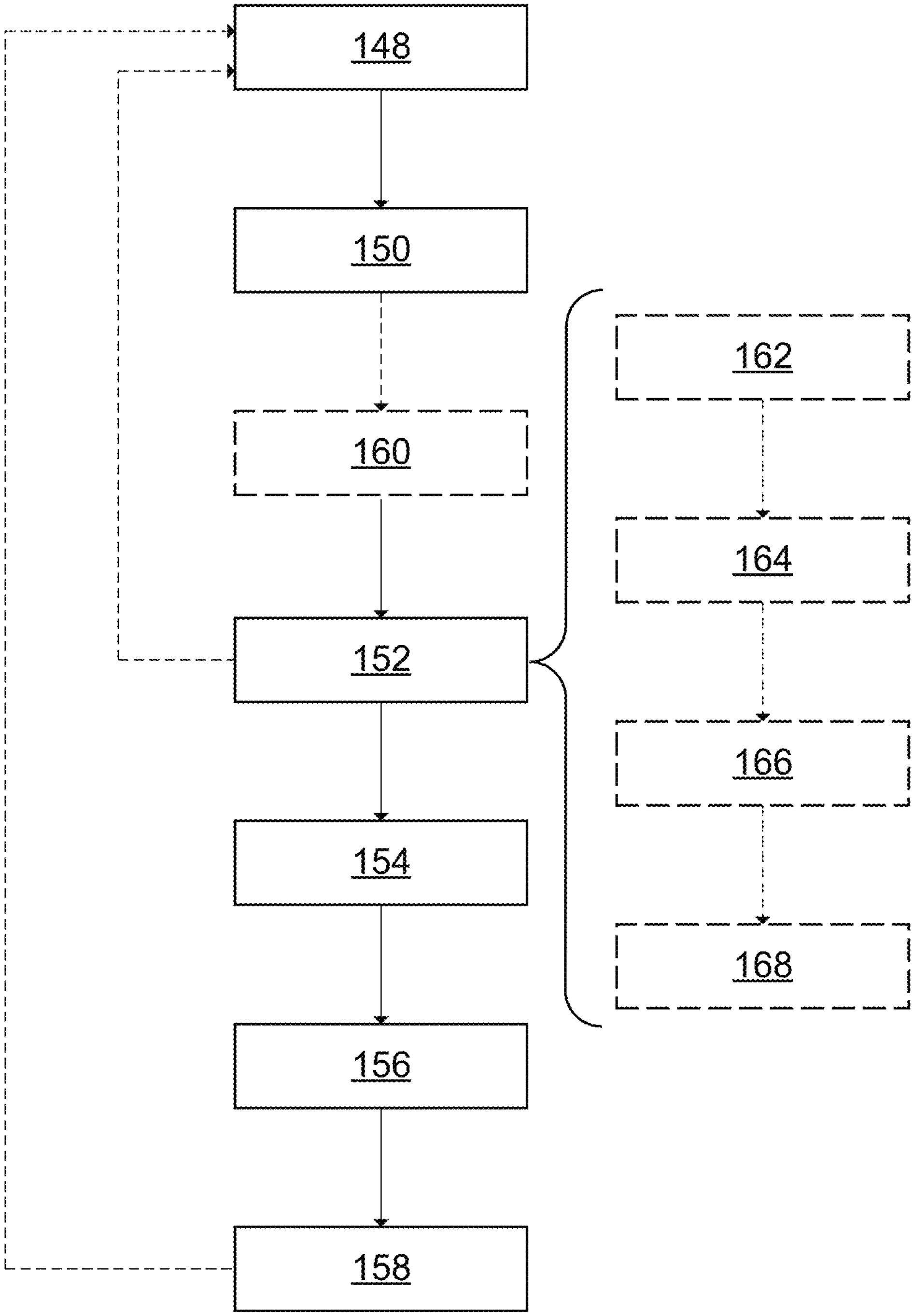
FIG. 2 illustrates a flow chart of an exemplary embodiment of a method for assigning an address to an electronic device according to the present disclosure.

FIG. 2 illustrates a flow chart of an exemplary embodiment of a method for assigning an address to an electronic device 112 according. Thus, the electronic device 112 has an address assigned by using at least the following steps:

a) (denoted by reference numeral 148) sending a general command from the controller 114 of the circuit arrangement 110 to all electronic devices 112 of the circuit arrangement 110, wherein the general command prompts each electronic device 112 to start sending a respective unique identifier (UID) of the respective electronic device 112;

b) (denoted by reference numeral 150) sending the respective UIDs from the electronic devices 112 bit-by-bit in parallel;

c) (denoted by reference numeral 152) performing a bit-by-bit arbitration among the electronic devices 112 based on the UIDs until only one electronic device 112 remains active;

d) (denoted by reference numeral 154) sending an electrical parameter from the active electronic device 112 to the controller 114;

e) (denoted by reference numeral 156) determining a property of the active electronic device 112 from the electrical parameter; and f) (denoted by reference numeral 158) assigning an address to the active electronic device 112 from a predetermined set of addresses.

Step f) may further comprise acknowledging the assigned address by a handshake between the active electronic device 112 and the controller 114. Steps a) to f) may be repeated continuously until all electronic devices 112 of the circuit arrangement 110 are assigned an address. After each repetition cycle, assigned addresses and electronic devices 112 with assigned addresses may be left out for the following repetition cycles. If more than one electronic device 112 remains active at step c), the method may be restarted at step a). The method may further comprise a step b1) performed after step b) and denoted by reference numeral 160. Step b1) may comprise receiving the UIDs of the electronic devices 112 with the controller 114. The controller 114 may also perform steps e) and f). The method may at least partially be computer-implemented, e.g. when performing step e). The bit-by-bit arbitration in step c) may comprise the following sub-steps performed by each electronic device 112:

c1) (denoted by reference numeral 162) bit-by-bit receiving the UIDs of all further electronic devices 112 of the circuit arrangement 110;

c2) (denoted by reference numeral 164) bit-by-bit comparing each bit of the own UID to a logical disjunction of the corresponding bits of the UIDs of the further electronic devices 112;

c3) (denoted by reference numeral 166) if a bit of the own UID is equal to the logical disjunction, remain active by continuing to send the UID; and c4) (denoted by reference numeral 168) if a bit of the own UID not equal to the logical disjunction, go passive by stopping to send the UID.

In the following, a specific implementation of the method generally illustrated in FIG. 2 will be described with respect to the circuit arrangement 110 illustrated in FIG. 1. The implementation is one exemplary option which will be explained for illustrative purposes and which shall not be construed as restrictive. Other options may of course also exist. The clock 126 of the controller 114 may set a system frequency of the circuit arrangement 110 for data transmission, which may also be used for the outlined bit-by-bit arbitration. The controller 114 may send a corresponding clock signal to all electronic devices 112 via the clock line 120. The interconnection 116 comprising the clock line 120 may as said specifically be a serial bus 116. Further, the controller 114 may send data signals to the electronic devices 112 via the data line 118 of the serial bus 116. Addressing specific electronic devices 112 may require the controller 114 to know their addresses before. Thus, addresses may need to be assigned to the electronic devices 112 before normal operation.

For such purpose, the controller 114 may initially send a general command to all electronic devices 112 via the serial bus 116. The general command may be received and understood by all electronic devices 112. The general command may prompt each electronic device 112 to start sending its respective UID bit-by-bit via the serial bus 116. Thus, all electronic devices 112 may buffer their own UIDs bit-by-bit in the output buffer 140, send them in parallel to the serial bus 116 and perform a bit-by-bit arbitration in order to decide which electronic device 112 may be allowed to control the serial bus 116. During the bit-by-bit arbitration, each electronic device 112 may bit-by-bit receive the UIDs of all further electronic devices 112 from the serial bus 116 as a logical disjunction and may buffer it in the input buffer 140. Each electronic device 112 may then bit-by-bit compare the own UID to the received logical disjunction of all further UIDs. If a bit of the own UID is equal to the logical disjunction, the electronic device 112 may remain active by continuing to send its UID. If a bit of the own UID not equal to the logical disjunction, the electronic device 112 may go passive by stopping to send its UID and may thus not participate in the further bit-by-bit arbitration anymore. Overall, the bit-by-bit arbitration may be continued among the electronic devices 112 until only one electronic device 112 remains active.

The active electronic device 112 may then send an electrical parameter to the controller 114. Specifically, the electrical parameter may comprise an application-specific resistance of the component 134, which may specifically be an application-specific resistor 134. The supply source 130, which may specifically be a current source 130, may apply a predetermined current to the resistor 134, which may result in an application-specific voltage. Said voltage may then be converted into a digital signal by the ADC 138 and transferred to the logic circuit 136 and further on to the controller 114 via the serial bus 116. The controller 114 may then determine a property of the electronic device 112 from the electrical parameter. Specifically, the controller 114 may determine a position of the electronic device 112 from the electrical parameter. The controller 114 may have a lookup table stored in a memory, which may map individual already known resistance values to a position within the circuit arrangement 110. From the position, further properties, such as a function of the electronic device 112 in the circuit arrangement 110 may be then derived, e.g. by considering mounting options of the PCB 128. Lastly, the controller 114 may assign an address from a predetermined set of addresses to the electronic device 112, such that it can be addressed later during operation. The set of addresses may also be stored in a memory of the controller 114. The controller 114 may then acknowledge receipt of the address.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

It should be noted that the methods and devices including its preferred embodiments as outlined in the present document may be used stand-alone or in combination with the other methods and devices disclosed in this document. In addition, the features outlined in the context of a device are also applicable to a corresponding method, and vice versa.

Furthermore, all aspects of the methods and devices outlined in the present document may be arbitrarily combined. In particular, the features of the claims may be combined with one another in an arbitrary manner.

It should be noted that the description and drawings merely illustrate the principles of the proposed methods and systems. Those skilled in the art will be able to implement various arrangements that, although not explicitly described or shown herein, embody the principles of the disclosure and are included within its spirit and scope. Furthermore, all examples and embodiments outlined in the present document are principally intended expressly to be only for explanatory purposes to help the reader in understanding the principles of the proposed methods and systems. Furthermore, all statements herein providing principles, aspects, and embodiments of the disclosure, as well as specific examples thereof, are intended to encompass equivalents thereof.

The invention claimed is:

1. A method for assigning an address to an electronic device, the method comprising:

a) sending a general command from a controller of a circuit arrangement to all electronic devices of the circuit arrangement, wherein the general command prompts each electronic device to start sending a respective unique identifier (UID) of the respective electronic device;

b) sending the respective UIDs from the electronic devices bit-by-bit in parallel;

c) performing a bit-by-bit arbitration among the electronic devices based on the UIDs until only one electronic device remains active;

d) sending an electrical parameter from the active electronic device to the controller;

e) determining a property of the active electronic device from the electrical parameter; and f) assigning an address to the active electronic device from a predetermined set of addresses.

2. The method according to claim 1, wherein steps a) to f) are repeated continuously until all electronic devices of the circuit arrangement are assigned an address, wherein, after each repetition cycle, assigned addresses and electronic devices with assigned addresses are left out for the following repetition cycles.

3. The method according to claim 1, wherein the electrical parameter is selected from the group consisting of: a voltage; a resistance; a current.

4. The method according claim 1, wherein the electrical parameter is predetermined by at least one of a component of the electronic device and an external supply source.

5. The method according to claim 1, wherein the electrical parameter is predetermined by at least one of an application-specific resistance, an application-specific capacitance, and an application-specific inductance of at least one component of the electronic device.

6. The method according to claim 1, wherein step d) comprises sending an application-specific voltage from the active electronic device to the controller, wherein the application-specific voltage is dependent on an application-specific resistance of a component of the electronic device, wherein the component is an application-specific resistor.

7. The method according to claim 1, wherein the property determined in step e) is selected from the group consisting of: a position of the electronic device; a function of the electronic device; a type of the electronic device.

8. The method according to claim 1, wherein the bit-by-bit arbitration in step c) comprises the following sub-steps performed by each electronic device:

c1) bit-by-bit receiving the UIDs of all further electronic devices of the circuit arrangement;

c2) bit-by-bit comparing each bit of a particular UID to a logical disjunction of the corresponding bits of the UIDs of the further electronic devices;

c3) if a bit of the particular UID is equal to the logical disjunction, remain active by continuing to send the UID; and c4) if a bit of the particular UID not equal to the logical disjunction, go passive by stopping to send the UID.

9. The method according to claim 1, further comprising step b1) performed after step b), wherein step b1) comprises receiving the UIDs of the electronic devices with the controller.

10. The method according to claim 1, wherein the UIDs are sent via an interconnection of the circuit arrangement, wherein the interconnection at least partially interconnects the electronic devices and the controller.

11. The method according to claim 1, wherein at least one of the set of addresses, the general command and the bit-by-bit arbitration is defined in a communication protocol.

12. The method according to claim 1, wherein the electronic device is a part of a network and wherein the address is a network address.

13. An electronic device having an address assigned by using at least the following steps:

a) sending a general command from a controller of a circuit arrangement to all electronic devices of the circuit arrangement, wherein the general command prompts each electronic device to start sending a respective unique identifier (UID) of the respective electronic device;

b) sending the respective UIDs from the electronic devices bit-by-bit in parallel;

c) performing a bit-by-bit arbitration among the electronic devices based on the UIDs until only one electronic device remains active;

d) sending an electrical parameter from the active electronic device to the controller;

e) determining a property of the active electronic device from the electrical parameter; and f) assigning an address to the active electronic device from a predetermined set of addresses.

14. The electronic device according to claim 13, wherein the electronic device comprises at least one logic circuit for communication, specifically for performing the bit-by-bit arbitration.

15. The electronic device according to claim 13, wherein the electronic device comprises at least one buffer for buffering the UIDs bit-by-bit for the bit-by-bit arbitration.

16. The electronic device according to claim 13, wherein the electronic device comprises at least one component providing an application-specific electrical parameter.

17. A circuit arrangement comprising a plurality of electronic devices, at least one controller and at least one interconnection, wherein the interconnection at least partially interconnects the electronic devices and the controller, wherein at least one of the electronic devices has an address assigned by using at least the following steps:

a) sending a general command from the controller to all electronic devices of the circuit arrangement, wherein the general command prompts each electronic device to start sending a respective unique identifier (UID) of the respective electronic device;

b) sending the respective UIDs from the electronic devices bit-by-bit in parallel;

c) performing a bit-by-bit arbitration among the electronic devices based on the UIDs until only one electronic device remains active;

d) sending an electrical parameter from the active electronic device to the controller;

e) determining a property of the active electronic device from the electrical parameter; and f) assigning an address to the active electronic device from a predetermined set of addresses.

18. The circuit arrangement according to claim 17, wherein the circuit arrangement comprises at least one printed circuit board (PCB).

19. The circuit arrangement according to claim 17, further comprising at least one supply source configured for supplying at least one of an application-specific voltage and an application-specific current to at least one electronic device of the circuit arrangement.

20. The method according to claim 1, wherein the bit-by-bit arbitration comprises deciding, by the electronic devices themselves after each bit of the UIDs are sent, which electronic devices remain active by continuing to send their UIDs and which electronic devices go passive by stopping to send their UIDs.

* * * * *